UNITED STATES PATENT OFFICE.

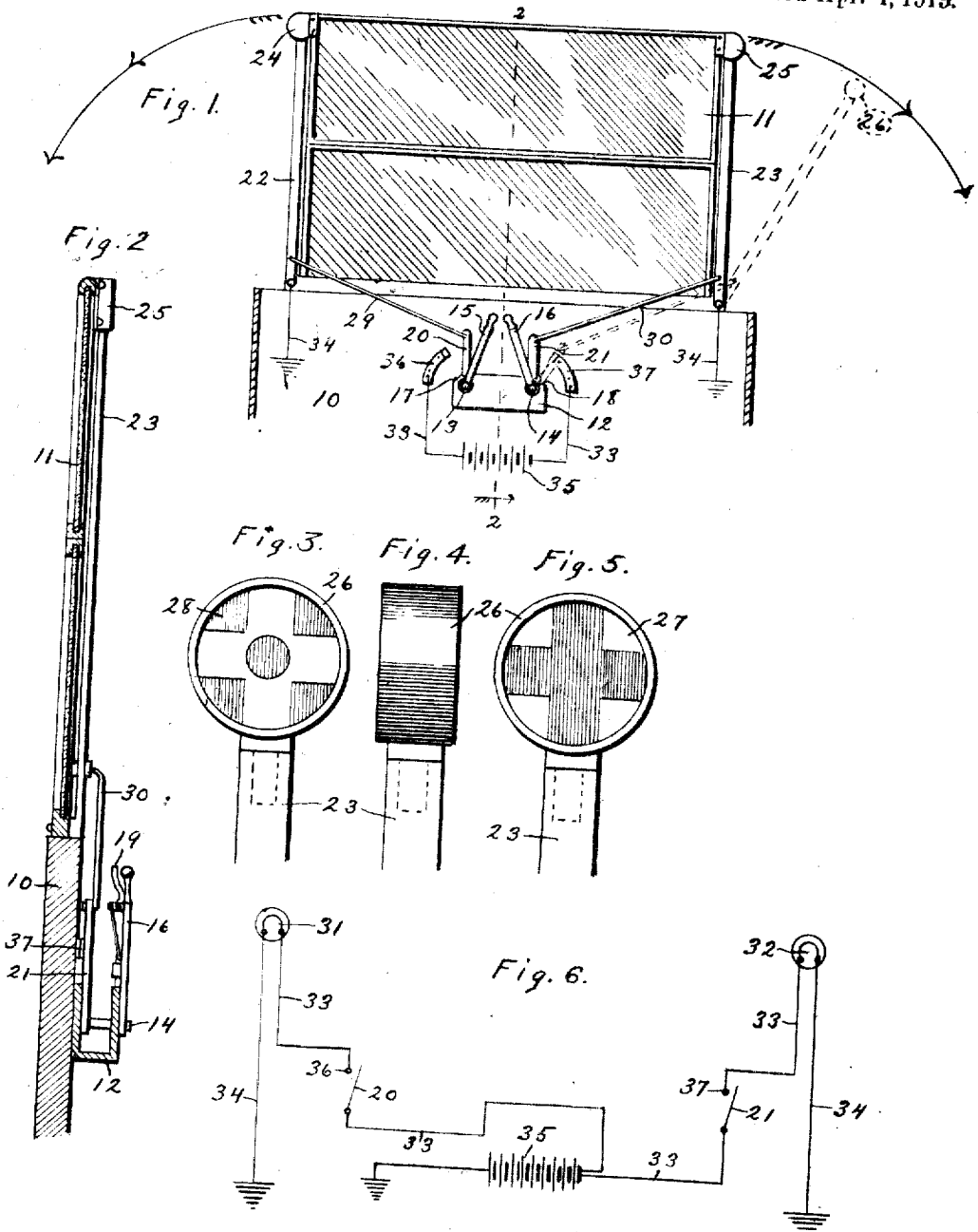

FRIEDRICH W. WITTKOWSKI, OF DES MOINES, IOWA.

TURNING-SIGNAL FOR AUTOMOBILES.

1,299,088.     Specification of Letters Patent.     Patented Apr. 1, 1919.

Application filed February 20, 1917. Serial No. 149,801.

*To all whom it may concern:*

Be it known that I, FRIEDRICH W. WITTKOWSKI, citizen of the United States, of America, and resident of Des Moines, Polk county, Iowa, have invented a new and useful Turning-Signal for Automobiles, of which the following is a specification.

The object of this invention is to provide improved means for signaling and indicating the proposed direction of turning a vehicle.

A further object of this invention is to provide improved means for indicating to traffic the intention and proposed direction of turning a vehicle from a straight line of travel.

A further object of this invention is to provide improved means for operating a turning signal.

A further object of this invention is to provide improved means for illuminating a turning signal.

A further object of this invention is to present a different form of signal forwardly from the one presented rearwardly, to indicate the direction in which the vehicle is moving.

A further object of this invention is to provide an improved arbitrary signal to differentiate between the forward and rear ends of a vehicle.

My invention consists in the construction, arrangement and combination of elements hereinafter set forth, pointed out in my claims and illustrated by the accompanying drawing, in which—

Figure 1 is a rear elevation, partly in section, illustrating my improved signaling mechanism in position for practical use, dotted lines indicating one of the signal arms in operative or signaling position. Fig. 2 is a vertical section on the line 2—2 of Fig. 1, on an enlarged scale. Figs. 3, 4 and 5 are rear, side and front elevations, respectively, of the end portion of a signaling arm, on an enlarged scale. Fig. 6 is a diagram of the electrical connections employed with the device.

In the construction of the devices as shown the numeral 10 designates the forward end member or instrument board of a vehicle such as an automobile of any suitable construction, on which is mounted a wind-shield 11 in a common manner. A bracket 12, preferably of channel form with its opening arranged uppermost, is mounted on and fixed to the central portion of the instrument board or support 10, and shafts 13, 14 are journaled for oscillation in said bracket, longitudinally of the vehicle, and on opposite sides of the median line thereof. The shafts 13, 14 project slightly at their rear ends through the rear member of the bracket 12, and hand levers 15, 16 are fixed respectively to said projecting ends and are adapted for movement through arcs manually to oscillate said shafts. Segmental racks 17, 18 are formed on or fixed to outer upper corner portions of the rear member of the bracket 12, and the levers 15, 16 are formed with detent devices 19, one of which is shown in Fig. 2, arranged on their forward sides and adapted to engage the racks 17, 18 respectively and hold the levers in any position in which they may be placed manually. Crank arms 20, 21 are fixed to the shafts 13, 14 respectively, adjacent the forward member of the bracket 12, and extend in a general upward direction from said shafts and approximately parallel with the levers 15, 16. Signal arms 22, 23 are pivoted at their lower ends to end portions of the lower frame member of the windshield 11, or to the vehicle body adjacent thereto, and said signal arms are of sufficient length to extend approximately to the top of said windshield. Housings 24, 25 are fixed to the upper outer corner portions of the windshield 11, and said housings are open at their outer sides and adapted to receive the upper ends of the signal arms 22, 23.

Signaling devices are carried by the upper ends of the arms 22, 23, and one of said signaling devices is shown in detail in Figs. 3, 4 and 5. A rim 26 is fixed to the upper end of each arm, in a plane transversely of the path of travel of the vehicle, and said rim is provided with glazing 27, 28 in its forward and rear sides respectively, whereby a cylindrical signaling device is formed with transparent front and rear faces. The glazing 27, 28 of front and rear of the signaling devices preferably are distinguishably different in character or coloring, to indicate to those familiar with arbitrary differences adopted to so distinguish, whether a vehicle on which the signals are carried is approaching or retreating, or whether the signal observed is on the front or rear of the vehicle. To this end I have shown the front glass 27 (Fig. 5) formed with a red Maltese cross and white segments between the arms thereof; and the rear glass 28 (Fig. 3) formed with a white Maltese cross and red segments between the arms thereof and also with a red circle in the center of the cross. Any arbitrary arrangement of designs or coloring may be employed for the front and rear glasses, and such designs or colors may be applied in any desired manner, to facilitate reading and understanding of the signals.

Upper ends of the crank arms 20, 21 are pivotally connected by links 29, 30, respectively, to intermediate portions of the signal arms 22, 23. When the parts are in the position shown by full lines, the arms 22, 23 are in upright positions adjacent the sides of the windshield 11, and the signaling devices formed by the glazed rims 26 are contained within and concealed by the housings 24, 25. The levers 15, 16 may be moved outwardly selectively, as indicated by dotted lines at the right in Fig. 1, to oscillate the corresponding shaft, 13 or 14, with its crank arm 20 or 21, and, through the links 29, 30, oscillate the signal arm 22 or 23 to an inclined or horizontal position away from the side of the windshield 11, or to signaling position, to indicate that the driver is about to turn the vehicle in the direction indicated by such arm, so selected and operated.

It is desirable to provide means for illuminating the signaling devices on the arms 22, 23, and to this end lamps 31, 32 are mounted within the rims 26, each lamp being provided with conductors 33, 34, the conductor 34 preferably being grounded in a suitable location on the frame of the vehicle. The conductors 33 lead to a suitable source of electrical energy such as a battery 35, preferably having one pole suitably grounded to the frame of the vehicle in a common manner, and each conductor 33 also is provided with a switch. In this instance I have shown the switches of the conductors 33 formed of contact plates 36, 37 of arcuate form mounted on the support 10 and adapted to be contacted by the crank arms 20, 21, which are of metal. The arcuate plates 36, 37 also serve as stops and limit outward movement of the arms 22, 23 by engagement with the crank arms 20, 21. When the signal arms 22, 23 are in upright position with the signaling devices 26 concealed within the housings 24, 25, the crank arms 20, 21 are out of contact with the plates 36, 37 and the circuits are broken, so that the lamps 31, 32 are not illuminated. When the levers 15, 16 are moved through arcs to extend the signal arms 22, 23, the crank arms 20, 21 contact with the plates 36, 37, complete the circuits, and illuminate the lamps 31, 32, such contact plates preferably being beveled on their initial ends to facilitate engagement by the crank arms. The contact plates 36, 37 may be so arranged that contact of the crank arms 20, 21 does not take place until the levers 15, 16 have been moved some distance, as indicated in Fig. 1, so that in daytime, when the illumination may not be required, the signal arms may be operated without illumination by a lesser movement of the levers. The conductors 33 may be attached to the contact plates 36, 37 and to the crank arms 20, 21 in any desired manner, and may follow the links 29, 30 and arms 22, 23 in inconspicuous positions.

The arms 22, 23 may be of any desired length and be arranged to move through arcs of any desired extent. In like manner the housings 24, 25 would be located at proportionate altitudes to receive the lamp casings on the arms and obstruct, obscure and hide the signaling plates and the lamps from view when the arms are in withdrawn positions.

I claim as my invention—

1. A turning signal for automobiles, comprising a support, a channel bracket mounted thereon, shafts journaled in said bracket and extending across the channel therein, signal arms pivoted on opposite sides of the support, operating levers connected with said shafts, crank arms on the shafts, and links pivotally connecting said crank arms to the signal arms.

2. A turning signal for automobiles, comprising a support, a channel bracket mounted thereon, shafts journaled in said bracket and extending across the channel therein, signal arms pivoted on opposite sides of the support, operating levers connected with the shafts outside the bracket, crank arms connected with said shafts within the bracket, and links pivotally connecting said crank arms to the signal arms.

Signed by me at Des Moines, Iowa, this 15th day of February, 1917.

FRIEDRICH W. WITTKOWSKI.